United States Patent Office 3,068,690
Patented Dec. 18, 1962

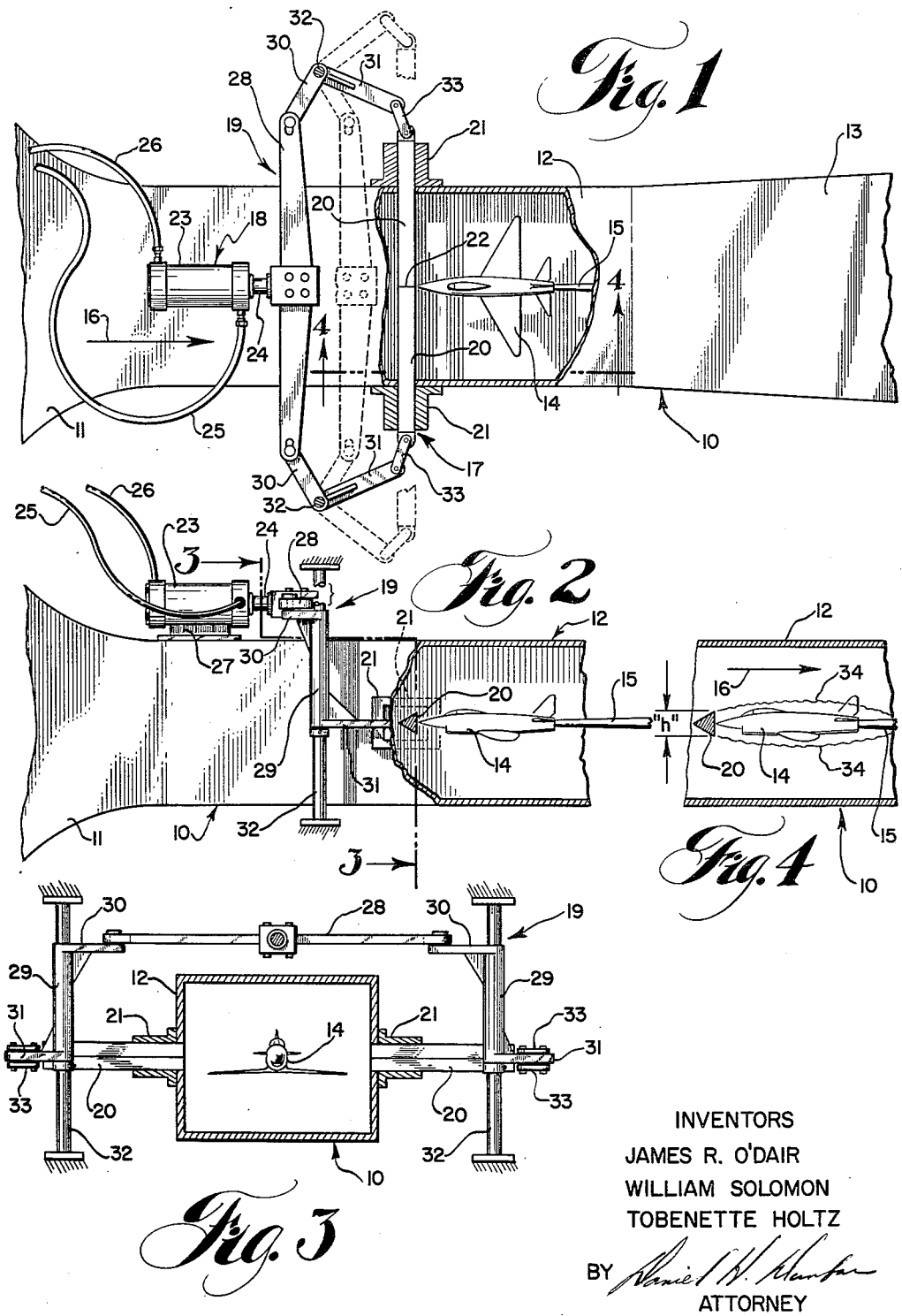

3,068,690
WIND TUNNEL TESTING
James R. O'Dair, Reynoldsburg, and William Solomon and Tobenette Holtz, Columbus, Ohio, assignors to North American Aviation, Inc.
Filed Apr. 11, 1958, Ser. No. 727,988
19 Claims. (Cl. 73—147)

This invention pertains generally to wind tunnel testing, and is particularly concerned with an improved method, and improved apparatus, for utilization in connection with the testing of models and the like in wind tunnels having supersonic-velocity air flow capabilities.

We have discovered that numerous advantages may be obtained with respect to wind tunnel testing through use of the method and apparatus of this invention. In general, this invention contemplates the application of a separation technique to portions of a wind tunnel airstream during tunnel starting and stopping operations, and the provision of means for effecting proper air flow separation during such starting and stopping operations. Through use of the method and means of this invention, the shock system and pressures associated with wind tunnel supersonic-velocity air flow conditions may be readily restricted as to location during the starting and stopping phases of tunnel operation, and adverse test model loadings and test model damage typically associated with shock system instability may be minimized.

Accordingly, it is an important object of this invention to provide an improved method for restricting location of a wind tunnel airstream shock system during tunnel starting operation, and for starting supersonic-velocity air flow in a wind tunnel test region.

Another object of this invention is to provide an improved method for restricting the location of oscillatory pressures and airstream shock systems during a supersonic wind tunnel air flow stopping operation, and for stopping supersonic-velocity air flow in a wind tunnel test region.

Another object of our invention is to provide an improved method for testing models of aircraft and the like in supersonic wind tunnels, which method minimizes the adverse loadings and consequential damage typically associated with such models during the starting and stopping of supersonic-velocity airstream flow in the test tunnel.

Another object of this invention is to provide a method of wind tunnel operation which does not adversely affect desired characteristics of air flow existing within the test region of a wind tunnel installation.

A still further object of this invention is to provide proper apparatus for use in effecting the improved method of wind tunnel operation and wind tunnel model testing of this invention.

Another object of this invention is to provide apparatus for minimizing the adverse test model loadings and test model damage typically associated with air flow starting and stopping operations for wind tunnels having supersonic-velocity air flow operating characteristics.

Another object of this invention is to provide a method and apparatus for providing balanced and symmetrical initial supersonic loadings upon test models positioned in a wind tunnel test region having airstream flow separator means for use during the establishing and collapsing of supersonic-velocity air flow through such region.

Another object of this invention is to provide a method of wind tunnel operation, and to provide wind tunnel apparatus, for preventing the existence or momentary stabilization of a supersonic-velocity airstream shock system upon a test model located in the test region of a supersonic wind tunnel.

Another object of our invention is to provide an improved method of wind tunnel operation and wind tunnel model testing, in combination with apparatus for the practice of such method, which may be readily effected, which may be economically achieved, and which has an extremely high degree of operational reliability.

Other objects and advantages of this invention will become apparent during consideration of the detailed description and the drawings.

In the drawings, wherein like numerals are used to reference like components throughout the same:

FIG. 1 is a plan view of portions of a supersonic wind tunnel having features of this invention incorporated therewith.

FIG. 2 is a side elevational view of the installation of FIG. 1;

FIG. 3 is a sectional view taken along the line 3—3 of FIG. 2; and

FIG. 4 is a sectional view taken along the line 4—4 of FIG. 1.

The supersonic wind tunnel 10 of FIG. 1 is illustrated as schematically including a tunnel converging portion 11, a tunnel test section 12, and a tunnel diverging portion 13. Portions 11 and 13 are typically designed for three-dimensional airstream flow, although the invention described and claimed herein may be advantageously utilized in supersonic wind tunnels having essentially only two-dimensional air flow in its converging and diverging portions. Converging portion 11 may also be referred to as a nozzle section, test section 12 may also be referred to as a test region, and diverging portion 13 may also be referred to as a subsonic diffuser section.

A test model 14 of an aircraft or the like is positioned within test region 12 upon support means 15. The model 14 is generally instrumentated with strain gages, pressure transducers, thermocouples, and the like; circuitry components for such devices are preferably contained interiorly of probe-like support means 15 and are routed therethrough to proper recording instruments. During model testing operations, the direction of air flow corresponds to the direction of arrow 16.

During starting and stopping operations associated with typical supersonic wind tunnels, an oscillatory shock system and oscillatory pressure conditions generally are located throughout test region 12, and in the region of the junction of wind tunnel section 12 and subsonic diffuser section 13. Because such oscillatory shock systems are often of high magnitude, it is not unusual to thereby experience adverse and destructive loadings being placed upon model 14.

In order that such shock system and oscillatory pressure conditions might be located in non-contacting relation to model 14 during tunnel starting and stopping operations, and in order that adverse loading and damaging of model 14 might be avoided, we advocate use of an airstream flow separation technique and we provide air flow separator means 17 and actuator means 18 for carrying out that technique. A linkage 19 may be used to connect flow separator means 17 to actuator means 18.

Flow separator means 17 is preferably comprised of movable shield portions 20, and support components 21 for the shield portions. Shield portions 20 are preferably separable along the line 22.

Actuator means 18 is illustrated as being comprised essentially of an air cylinder 23, or the like, having an extendible rod 24 which typically is secured to a piston contained within cylinder 23. Opposed internal chambers in cylinder 23 are supplied with compressed air or the like through air supply lines 25 and 26. Cylinder 23 may be secured to tunnel portion 11 through proper fastening of support portion 27 thereof.

Linkage 19 includes cross-bar 28, and bellcranks 29. Each bellcrank 29 is provided with lever arm portions 30 and 31 and is supported by pivot means 32. Each lever arm 30 is pivotally connected to cross-bar 28, and each lever arm 31 is connected to a movable shield portion 20 through a connector link 33.

It is preferred that, prior to starting supersonic-velocity air flow in tunnel portion 12, protector means 17 be located as illustrated in FIGS. 1 and 2. As the velocity of the air stream located in test region 12 is increased from zero, through transonic velocity regions, and to a supersonic-velocity level, portions of the airstream flow located in test region 12 are separated by means 17 so as to substantially flow above and below model 14. (See pictorial flow boundary lines 34 of FIG. 4.) As a result, the shock system and varying pressure changes associated with supersonic-velocity air flow will be confined to a non-contacting relation relative to model 14, and thus severe loading and damaging of model 14 may be avoided. When a stabilized supersonic-velocity air flow condition is attained in tunnel section 12, actuator means 18 is then operated to preferably move shield portions 20 to the position shown in FIG. 3. In doing this, rod 24 and cross-bar 28 are moved to the dotted line position of FIG. 1, bellcranks 29 are rotated about their pivots 32, and each shield portion 20 is withdrawn simultaneously and at a like rate from within the airstream supersonic-velocity portion. In effecting this operation, model 14 is preferably subjected only to balanced and symmetrical initial loadings. In a typical application, shield portions 20 are moved to their extreme positions in as little time as 0.2 second.

The technique of this invention is also preferred for use during stopping operations associated with a supersonic wind tunnel installation. Immediately prior to initiating a decreasing transonic velocity change in test region 12, flow separator means 17 are installed in the wind tunnel airstream supersonic-velocity portion as in their FIG. 1 position. As airstream velocity is so-reduced, the shock system and oscillating pressure conditions typically associated therewith are restricted to a non-contacting relation relative to test model 14 to thus eliminate destructive forces being applied to model 14. After establishing subsonic air flow or after stopping air flow in region 12, means 17 may subsequently be withdrawn to their FIG. 3 position for subsonic testing, or they may be retained in their FIG. 1 position for use in connection with that operation of again establishing supersonic-velocity airstream flow in test region 12.

It is preferred that air flow separator means 17, actuator means 18, and connecting linkage 19 be arranged to cause symmetrical movement of shield portions 20 with respect to model 14. Also, it is preferred that shield portions 20 be provided with a wedge-shaped cross-section, that they be positioned generally in the plane of model 14, and that the apex of the wedge cross-section be directed into the airstream. This arrangement is best illustrated in FIG. 4. In a typical application, a leading edge included angle of approximately 60° has been found very satisfactory. Also, it is preferred that the height "h" of shield portions 20 approximate the height of the fuselage portion of model 14.

FIG. 4 also illustrates, by pictorial lines 34, the separation of test region air flow by means 17 during the above-described starting and stopping operations of this invention. The airstream contained in test region 12 is momentarily separated into general portions passing above and below model 14. Lines 34 define an enveloping low-speed wake which exists during flow separation, and it should be pointed out that adverse oscillatory shock systems and the like will not exist therein during supersonic wind tunnel air flow starting and stopping operations.

It is also preferred that means 20 be located quite adjacent model 14 and upstream thereof. In this manner the low-speed wake contained within separation lines 34 will envelope model 14 a sufficient distance downstream to fully protect it against damage. Other cross-sectional configurations, such as bullet-nose sections and the like, may be utilized in connection with shield portions 20; however, evaluations have established that the wedge-shaped configuration is preferred for most supersonic wind tunnel applications. Also, in some instances it may be desirable to provide a slight gap (3/32 inch-3/16 inch) intermediate adjacent ends of individual shield portions 20 when they are located in their extended (FIG. 1) position. This gap will generally correspond to line 22 of FIG. 1.

The features of this invention have been described with respect to a wind tunnel having closed sides. However, it should be noted that the invention may also be utilized in connection with wind tunnels of open-side construction. With respect to a tunnel having closed sides, it is necessary that shield portions 20 be withdrawn to a flush position so as to minimize air flow disturbances in region 12. In connection with tunnel installations having open sides, it is required that the shields 20 be withdrawn a sufficient distance beyond the region of supersonic-velocity air flow to leave airstream free-jet boundaries unaffected.

The invention described and claimed herein has been successfully utilized in connection with supersonic wind tunnels wherein the experienced test model starting and stopping loads have ranged from twenty times to fifty times the model's steady load. In most instances the degree of shock load reduction effected has been sufficient to eliminate structural damage to models of conventional construction.

Thus, it will be noted that we have provided an improved method and improved apparatus for use in connection with the starting and stopping of supersonic-velocity air flow in a wind tunnel test region. Through the use of the method and means of this invention, oscillating shock systems and pressure conditions which are typically associated with supersonic wind tunnels may be readily restricted as to location during starting and stopping phases of tunnel operation. Also, through utilization of the method and means of this invention, adverse test model loadings and the test model damage typically associated with shock system instability may be minimized. Other advantages of our invention are set forth elsewhere in this specification.

It is to be understood that the forms of the invention herewith shown and described are to be taken as preferred embodiments of the same, but that various changes in the shape, size and arrangement of parts may be resorted to without departing from the spirit of the invention or the scope of the subjoined claims.

We claim:

1. In a wind tunnel installation having a model to be tested in an airstream, protector means for momentarily separating portions of said airstream and for flowing separated portions of said airstream around said model, and actuator means connected to the protector means for moving said protector means and for uniting separated portions of said airstream.

2. In a wind tunnel having a test model to be positioned in a supersonic-velocity airstream, flow separator means contained in said airstream for enveloping a low-speed wake around said model, and actuator means connected to said flow separator means for moving said flow separator means from within said airstream and for collapsing said low-speed wake.

3. A wind tunnel for aerodynamic testing of a model positioned therein in a supersonic-velocity airstream, and comprised of: a supersonic-velocity airstream test region, movable protector means located upstream of said model and within and extending across said test region for separating portions of the airstream, and actuator means connected to said protector means for withdrawing and inserting said protector means from and into said test region.

4. The wind tunnel defined in claim 3, wherein the protector means includes separate portions positioned symmetrically relative to said model, and wherein said actuator means withdraws and inserts said protector means separate portions from and in said test region symmetrically with respect to said model.

5. The wind tunnel installation defined in claim 3, wherein the protector means has a generally wedge-shaped cross-section, and wherein said cross-section has a height approximating the height of said model.

6. In a wind tunnel for aerodynamically testing a model positioned in a test region, in combination: a test region, a supersonic-velocity airstream located in said test region, and separator means extended across said airstream for separating portions of said airstream during major changes in airstream velocity and for flowing separated portions of said airstream substantially above and below said model in non-contacting relation, said separator means being movable in said airstream to place said airstream in contacting relation to said model.

7. The wind tunnel combination defined in claim 6, wherein there is also included actuator means connected to said separator means, said actuator means being operated to move said separator means from within said airstream subsequent to natural longitudinal stabilization of the shock system associated with said airstream.

8. The wind tunnel combination defined in claim 6, wherein there is included actuator means located exterior to said airstream and connected to said separator means, said actuator means being operated to move said separator means transverse to and into said airstream prior to substantially decreasing the supersonic-velocity of said airstream.

9. In a supersonic wind tunnel having a model positioned in a test region thereof: movable wedge-like flow separator means positioned in said test region substantially in the plane of said model, adjacent said model, and substantially across said test region, said separator means having a height approximating the height of said model and having a leading edge portion oriented upstream of said model.

10. In a method of aerodynamically loading a test model positioned in wind tunnel supersonic-velocity airstream region, the steps of starting supersonic-velocity air flow in said region, simultaneously separating and flowing separate portions of said supersonic-velocity air flow above and below said test model, and thereafter uniting said airstream separated portions at said test model to thereby subject said test model to the aerodynamic loading of said supersonic-velocity air flow.

11. In a method of testing a model in a wind tunnel test region, the steps of separating portions of the flow of a supersonic-velocity airstream in said region forward of said model, establishing supersonic-velocity airstream flow in said test region and in non-contacting relation substantially above and below said model, and causing said supersonic-velocity airstream to contact said model when the wind tunnel shock system has been stabilized downstream of said model.

12. A method of testing an aircraft model or the like in a wind tunnel supersonic test region which includes the steps of initiating supersonic-velocity air flow in said test region, simultaneously enveloping said model with a subsonic-velocity wake in said test region, and thereafter collapsing said subsonic-velocity wake within said supersonic-velocity air flow.

13. In a method of wind tunnel testing a model, the sequential steps of separating a supersonic-velocity airstream into spaced-apart supersonic-velocity air-stream portions, flowing said portions of said air-stream substantially above and below said model in non-contacting relation thereto, and thereafter reducing the velocity of said supersonic-velocity air-stream to a subsonic-velocity level.

14. In a method of stopping supersonic-velocity air flow in a wind tunnel test region having a test model positioned therein, the steps of dividing a supersonic-velocity air-stream flowing in said test region to thereby develop a subsonic-velocity wake in surrounding relation to said test model, and thereafter substantially reducing the velocity of the air-stream contained in said test region to a subsonic-velocity level.

15. In a method of operating a wind tunnel having a movable flow separator means for protecting a test model located in a test region from damage by a transient shock system, the sequential steps of: positioning said flow separator means across said test region directly upstream of said model, developing an airstream in said test region which is continuously of supersonic-velocity magnitude fore and aft of said model, and thereafter moving said flow separator means from said test region to thereby immerse said model in said supersonic-velocity airstream.

16. A method of establishing supersonic-velocity air flow in a wind tunnel test region having a test model and having a movable flow separator means associated therewith, comprising the steps of: moving said flow separator means into said test region directly forward of said model and extending said flow separator means across said model, starting air flow in said test region and increasing the velocity of said air flow until a wind tunnel shock system is stabilized entirely downstream of said model, and thereafter moving said flow separator means from within said test region to thereby aerodynamically load said model for testing.

17. In a method of reducing airstream velocity in a wind tunnel having a movable flow separator means for protecting a test model located in a test region which partially confines a supersonic-velocity airstream, the sequential steps of: positioning said flow separator means in said supersonic-velocity airstream and across said test region directly upstream of said model, and reducing the velocity of said supersonic airstream in said test region to a subsonic-velocity value fore and aft of said model.

18. A method of decreasing supersonic-velocity air-stream flow in a wind tunnel test region having a test model and having a movable flow separator means located exterior to said supersonic-velocity airstream, comprising the steps of: moving said flow separator means into said test region directly forward of said model, extending said flow separator means across said model, and simultaneously maintaining said flow separator means in its moved position and reducing airstream velocity until the velocity of said supersonic-velocity air-stream has been reduced sufficiently so that the wind tunnel shock system associated with said airstream is moved upstream of said model and said test regtion.

19. A method of testing an aircraft model in a wind tunnel having a test region and flow separator means associated therewith, said model being contained in said test region, comprising the steps of: inserting said flow separator means across said test region directly upstream of said model, developing an airstream in said test region which is continuously of supersonic-velocity magnitude fore and aft of said model, thereafter withdrawing said flow separator means from said test region to thereby subject said model to said supersonic-velocity airstream, testing said model with the aerodynamic loading resulting from said supersonic-velocity airstream, re-inserting said flow separator means across said test region directly upstream of said model, and thereafter reducing the velocity of said airstream from a supersonic-velocity value to a subsonic-velocity value while maintaining said model and said flow separator means in said test region.

References Cited in the file of this patent

UNITED STATES PATENTS

| | | |
|---|---|---|
| 2,488,810 | Easterday | Nov. 22, 1949 |
| 2,551,470 | Smith | May 1, 1951 |
| 2,580,228 | Johnson | Dec. 25, 1951 |
| 2,740,426 | Dorfan | Apr. 3, 1956 |
| 2,776,806 | Brendal | Jan. 8, 1957 |